INFORMATION EXTRACTING SYSTEM

Filed Dec. 14, 1956 2 Sheets-Sheet 1

INVENTORS.
Kun Li Chien &
Charles L. Propster, Jr.
BY
Morris A. Rabkin
ATTORNEY.

Jan. 3, 1961    KUN LI CHIEN ET AL    2,967,296

INFORMATION EXTRACTING SYSTEM

Filed Dec. 14, 1956    2 Sheets-Sheet 2

INVENTORS.
Kun Li Chien &
Charles L. Propster, Jr.
BY Morris [signature]
ATTORNEY.

United States Patent Office 2,967,296

Patented Jan. 3, 1961

2,967,296

INFORMATION EXTRACTING SYSTEM

Kun Li Chien, Fullerton, Calif., and Charles H. Propster, Jr., Haddonfield, N.J., assignors to Radio Corporation of America, a corporation of Delaware Filed Dec. 14, 1956, Ser. No. 628,455

10 Claims. (Cl. 340—172.5)

This invention deals with data processing systems, and more particularly with a device to extract information from the external storage of a large scale information handling system.

In information handling systems today, large volumes of information must be readily available to the system. For high-speed devices, information is most economically stored in binary form, on magnetic tape or drums, though other forms of storage are well known.

Information may be stored on magnetic media, for instance, in several parallel channels, each character being represented as the simultaneous combination of magnetic spots in coded form. Known systems utilize such parallel code to provide information. Individual characters are made up of a parallel combination of binary digits and a message is composed of several such characters in serial order. Most systems in use today utilize several magnetic tape machines as a large scale external memory.

It is frequently desirable to retrieve or extract one particular message from the memory store. With most known devices, the tape carrying the desired message must be connected to the computer or other data processing machines, the desired message must be found and transferred to a buffer storage which then may be connected to an output printer or other output device.

To facilitate searches, it is also desirable to be able to maintain a current index of first messages or order determining portions of first messages for each tape in the entire memory. Messages may be stored in a serial order according to the relative value of the order determining portions or criteria. The location of any particular message may be determined by comparison of the criterion of the desired message with criterion of the first messages, knowing each tape contains all messages whose criteria are greater than that of the first message of that tape and less than that of the first message of the next tape.

Accordingly, it is an object of the present invention to provide a device for interrogating the storage of a large-scale information handling system, and to extract a particular message therefrom.

It is a further object of the present invention to provide a device which will extract a desired message from a high-speed storage device and transfer the message to a low-speed output device.

It is still a further object of the present invention to prepare an index of order determining portions of the first message of each storage device of a storage system.

It is still a further object of the present invention to provide a device for checking the contents of a storage unit for accuracy and for printing out messages containing inaccuracies.

It is a further object of the present invention to provide a device which may connect to an individual storage unit and extract a particular message from that unit, printing out to an output unit.

It is a still further object of the present invention to provide a means for extracting individual messages from a large scale storage system without the use of a computer or other data processing machine of similar size.

Another object of the present invention is to provide a means for obtaining random interrogations of a large scale storage without interrupting computers or other large scale data processing machines with which the storage is integrated.

According to the present invention, the criterion of a desired message is placed in an interrogation unit. The particular tape which contains the desired message is addressed from the console and connected to the unit. A search key or criterion is entered into the internal memory of the interrogation unit. The tape is started and the messages are read sequentially. The criteria of the messages on the tape are compared with the criterion stored in the interrogation unit. When the comparison result indicates the proper message is located, the tape is stopped and is backed up to the beginning of that message. The entire message is read into a memory and is transmitted a character-at-a-time, upon demand, to an output printing device.

Modifications and additional circuitry provide other modes of operation to the present invention in which:

(1) The initial portions of the first message of each tape in the store may be printed to form an index;

(2) Any tape may be searched for improper or erroneous characters and the message containing the error may be written out;

(3) Any message positioned at the reading head of a connected tape may be printed out. For checking purposes, circuitry is provided whereby the internal storage of the extractor unit may be printed out.

The foregoing and other objects, the advantages and other features of the invention as well as the invention itself as to its organization and mode of operation, may be best understood from the following description when read in connection with the accompanying drawings, in which like reference numerals refer to like parts and in which.

Figure 1:
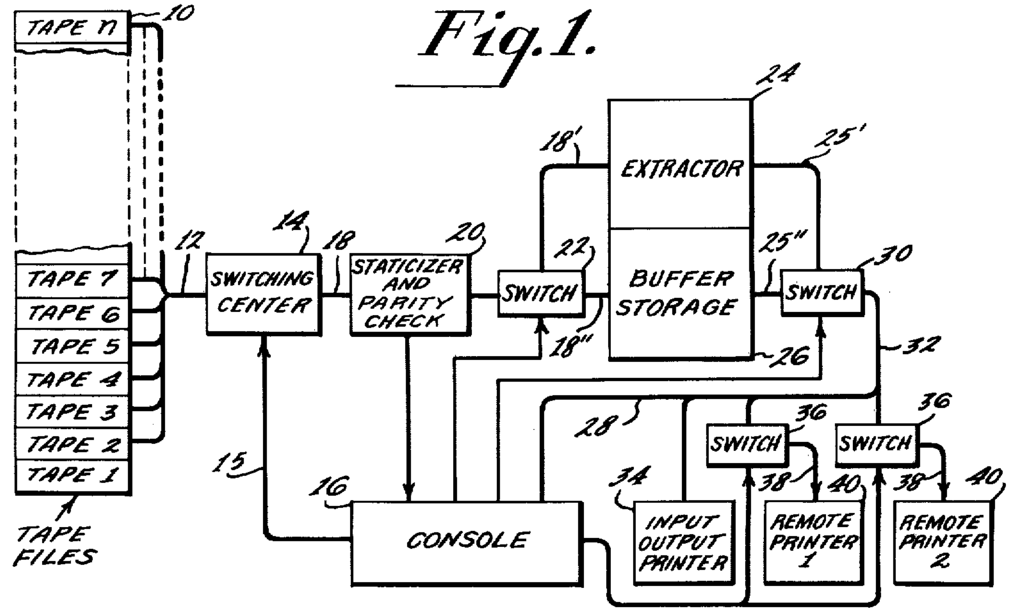
Figure 1 is a block diagram of an information extractor according to the present invention.

In Figure 1, a large external memory of an information handling system is shown. The memory may include a number of magnetic tape units or files 10 in which information may be stored. Multichannel cables 12 containing signalling lines and information lines are used to connect each of "*n*" tape files 10 to a switching center 14. The switching center 14 may be any known telephone-type switching device which addresses any one of the tape files and provides a connection between the tape file and the information extracting circuits.

A console 16 provides control signals to the switching center 14 on a cable 15 and through the switching center 14 to a connected tape file 10. The switching center 14 provides an output on multichannel cable 18 which contains control lines for control of the connected tape station 10 as well as information signal lines from the tape station 10 to the information extracting unit. The portion of the multichannel cable 18 carrying the information characters is applied to a staticizer and checking unit 20. A suitable checking circuit has been disclosed in the patent to A. M. Spielberg, No. 2,674,727, issued April 6, 1954. A signal staticizer has been disclosed in the patent to Dallas R. Andrews, No. 2,751,274, issued June 19, 1956. Another form of staticizer and signal "deskewer"

has been described in the copending patent application of Bernard Adler and Howard P. Guerber, Serial No. 588,714, filed June 1, 1956, entitled "Signal Staticizer" and assigned to the assignee of the present invention.

A parity error signal may be applied to the console 16 on a separate signal line when an error has been found. The staticized output of the information channels of the multichannel cable 18 and the other control channels are applied to a switch unit 22, which is controlled by a signal from the console 16 and which alternatively connects the output of the switching center 14 to either an extractor unit 24 on a line 18' or to a buffer storage serial memory unit 26 on a line 18''. Other embodiments may omit the switch unit 22, coupling the switching center 14 directly to both the extractor 24 and the memory unit 26.

The console 16 provides information and control signals to the extractor 24 and serial memory 26 through a multichannel line 28 which is applied to a second switch 30. The switch 30, controlled by the console 16, connects the multichannel line 28 either to the extractor 24 through line 25', or to the buffer storage system 26 through line 25''. Other embodiments may permit omission of the second switch 30 and couple all units on common lines, performing the switching function within the unit concerned. An input-output printer 34 provides signals on a multichannel line which joins in a common cable 32 with the output line of the console 28. The common cable 32 is connected by the switch 30 either to the extractor 24 or the buffer storage 26. The cable 32 includes signal lines and control lines which provide both input to and output from the extracting system. The output information signals as well as the input signals from the input-output printer 34 are applied to a third switch 36 which is controlled from the console 16. The third switch 36 serves to connect one or more additional input-output printers into the system. The output of the switch 36 is a multichannel line 38 which is applied to operate a remote printer 40.

Figure 2:
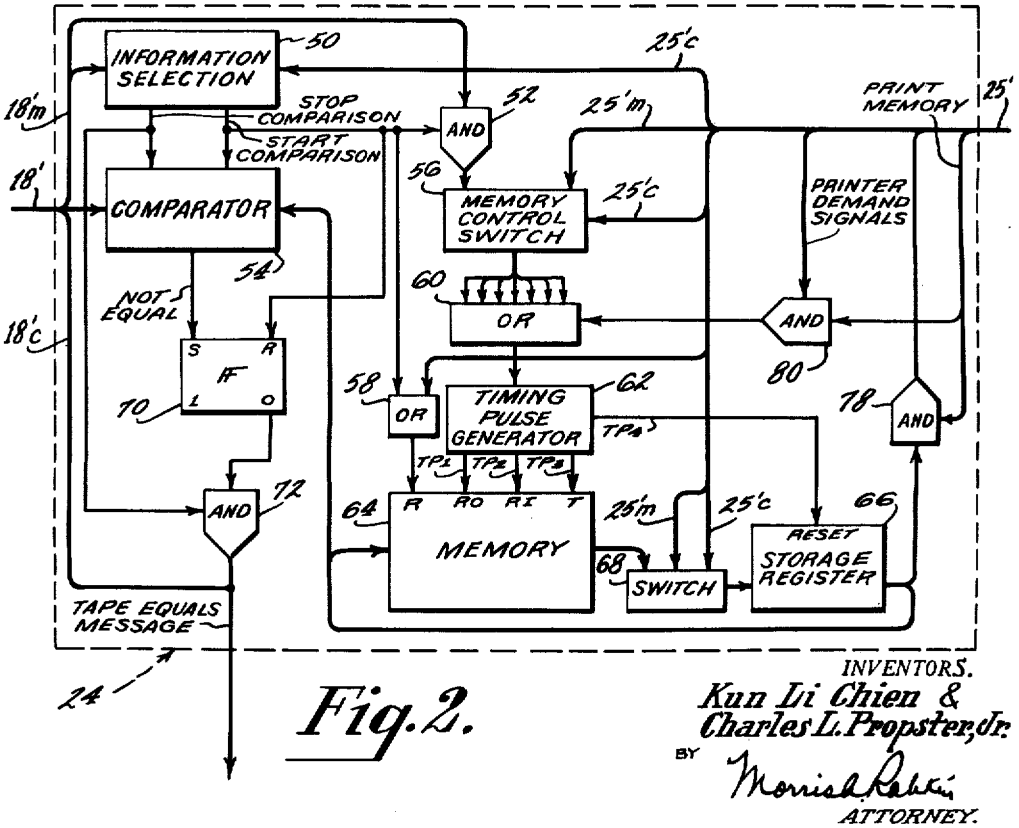
Figure 2 is a block diagram of an extractor suitable for use in the invention of Figure 1.

Figure 2 is a diagram of an extractor suitable for use in the invention of Figure 1. The cable output 18' of the switch 22 divides into information message channels 18'*m* and control signal channels 18'*c*.

The message channels 18'*m* are applied to an information selection circuit 50, to an "and" gate 52, and to a comparator 54. For ease of reader understanding, the "and" gate 52 is shown by a single block although the circuit contains an "and" gate for each of the channels in the multichannel message line 18'*m*. Suitable information selecting circuits have been described in the copending applications, Serial No. 418,679, now U.S. Patent No. 2,854,652, filed March 25, 1954, by Joel N. Smith, entitled "Information Selecting Circuit," and the application by Luis A. Fernandez-Rivas, Serial No. 431,627, now U.S. Patent No. 2,926,337, filed May 24, 1954, entitled "Data Selection Device," both of which are assigned to the assignee of the present invention.

The cable 25' connected to the switch 30 also includes multichannel message lines 25'*m* and multichannel control lines 25'*c*. The control lines 25'*c* are applied to the information selecting circuit 50 to control the selection of certain characters from incoming messages for comparison purposes. The order determining portion or criterion may thus be selected from the incoming message signals applied by line 18'*m*.

The information selecting circuit 50 provides a start comparison output signal on one line when the first of the selected criterion characters appear, and a stop comparison output signal on a second line after the last of the criterion characters is applied. These signals are applied to a comparator 54, and in addition, the start comparison signal is applied to the "and" gate 52. The output of the "and" gate 52 is applied to one input of a memory control switch 56, the other input of which is connected to the message channels 25'*m*. The line 25'*c* is connected to position the memory control switch 56 and is also applied to one input of a reset "or" circuit 58. A second input to the reset "or" circuit 58 is also connected to the start comparison line of the information selection circuit 50.

The multichannel output of the switch 56 is connected to a multi-input "or" circuit 60 which provides a single output in response to an input on any of the input channels. An additional input to the "or" circuit 60 is derived from a "demand" signal from an output printer 34 as explained below. The output of the "or" circuit 60 is applied to a timing pulse generator 62. A series of four timing pulses are derived from each input pulse. The generator 62 may be a tapped delay line or perhaps a set of one shot multivibrators combined with delay circuits.

A memory unit 64 is provided for interim storage of character signals. Message signal input to the memory 64 is a multi-bit, one-character storage register 66 which may be made up of several flip-flops or other one-bit storage devices, such as magnetic cores, each connected to a different one of the message channels.

The register input is the output of a switch 68 which is controlled by a signal from the control line 25'*c*. One input to the switch 68 connects with the message channels 25'*m* and the other switch input is connected to the output of the memory 64.

The output of the register 66 is connected both to the input terminals of the memory 64 and to one input of the comparator 54.

The outputs of the timing pulse generator 62 may be designated TP1, TP2, TP3, and TP4. The first timing pulse TP1 is applied to a read-out terminal, RO, of the memory 64. The timing pulse TP2 is applied to a memory read-in terminal, RI. The pulse TP3 is applied to trigger an address counter (not shown) within the memory 64, and the pulse TP4 is applied to reset the storage register 66. The output of the reset "or" circuit 58 is applied to reset the address counter of the memory 64.

The memory 64 may be a conventional core matrix which may be addressed by a counter, and which utilizes read-out and read-in pulses. Application of a read-out pulse drives the addressed cores, and the character is applied to the memory output. A character applied to the input terminal is read into the same address location at the occurrence of a read-in pulse. Triggering the address counter changes the memory location addressed. A pulse at the reset terminal R resets the address counter to an initial count and the memory is addressed to a starting location.

The comparator 54 may be one of many known comparison devices. For example, a suitable comparator is shown in the patent to R. A. Edwards, No. 2,615,127, issued October 21, 1952. The Edwards' comparator provides a signal of equality at one terminal and inequality at a second terminal. An enabling signal is applied from the information selection circuit 50 to permit the successive comparison of several characters.

To establish two criteria as identical, an additional circuit is added to the comparator 54, as indicated. The inequality output is applied to the set terminal of a not equal flip-flop 70. The reset input, R, of the not equal flip-flop 70 is connected to the start comparison output of the information selection circuit 50. The reset or (O) output of the not equal flip-flop 70 is applied to enable the "and" gate 72 which is enabled by the stop comparison output of the information selection circuit 50. The output of the "and" gate 72 is designated "Tape Equals Message." This signal is applied to the control line 18'*c* and is transmitted through the switch 22 and the switching center 14 to the connected tape station 10 where a stop-reverse signal is derived.

In order to print out the contents of the memory 64, a special print memory circuit is provided. A control signal "Print Memory" is applied on one of the lines of the control cable 25'*c*. The print memory signal is applied to the enabling input of an "and" gate 78 and further to an "and" gate 80. The "and" gate 78 may be considered as a combination of several individual "and" gates, each corresponding to a separate message channel.

The input of the "and" gate 78 is connected to the output of the storage register 66. The output of the "and" gate 78 is applied to the multichannel cable 25' where it is transmitted to the input-output printer 34 of Figure 1. The input-output printer 34 of Figure 1 may provide "demand" signals whenever its mechanism is ready to accept a character to be printed out. These "demand" signals are applied to a control line in the multi-channel cable 32 of Figure 1, and may be one of the control lines in the cable 25'c. The "demand" signal line is applied to an input of the "and" gate 80, the output of which is applied to the "or" circuit 60 as described above.

"And" gates, "or" circuit, and flip-flop are circuit components well known in the art and are, for instance, defined in the "IRE Standards on Electronic Computers—Definition of Terms, 1956" which appears at page 1166 of the "Proceedings of the IRE" for September 1956.

Figure 3:
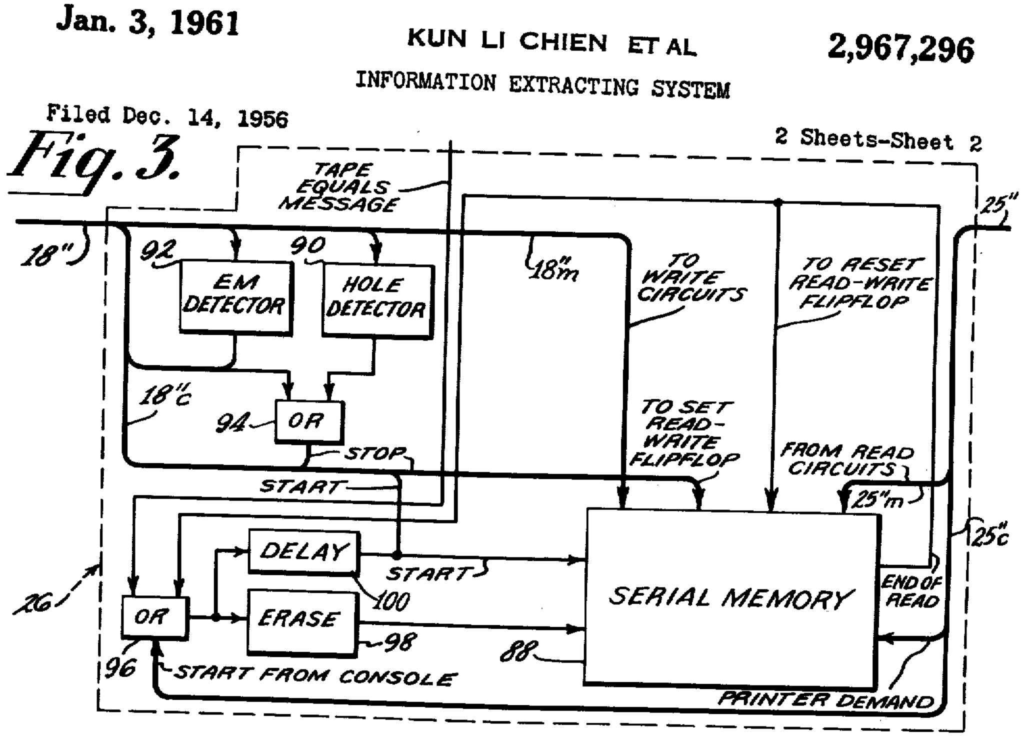
Figure 3 is a block diagram of a memory system suitable for use in the invention of Figure 1.

Figure 3 is a diagram of a buffer storage and serial memory suitable for use in the system of Figure 1.

A storage suitable for use in the present invention has been described in applicants' copending application entitled "Serial Memory System," Serial No. 447,162, filed August 2, 1954, now Patent No. 2,817,072, issued December 17, 1957, and assigned to the assignee of the present invention. In that application, two embodiments of the invention of this copending application are shown, one for use in an information system utilizing special character signals, for instance, start message, SM, and end message, EM, and a second embodiment wherein no special characters are used. For the purposes of the present invention, the embodiments of the prior application could be combined using the embodiment of Figure 3 of the earlier application with the addition of the special character recognizing circuits of Figure 1 of that application. For ease of explanation, only those parts which must be added to the applicants' other device are indicated in Figure 3 of the present invention, it being understood that the remainder of the circuit is substantially similar to that previously disclosed.

Suitable special character recognizers have been described in the patent of William R. Ayres, No. 2,648,829, issued August 11, 1953. Such devices may be adjusted to recognize the occurrence of signal combinations representing start message symbols (SM) and end message symbols (EM).

A "hole-detector," which produces a pulse after a pause of predetermined duration in the train of message signals has been described in the copending application of Howard P. Guerber, Linder C. Hobbs, and Arnold M. Spielberg, Serial No. 600,937, now U.S. Patent No. 2,907,010, filed July 30, 1956, entitled "System to Generate and Maintain Inter-Message Gaps," assigned to the assignee of the present invention.

The multichannel cable 18'' from the switch 22 includes both control lines 18''c and message lines 18''m. Similarly, the multichannel cable 25'' coming from the switch 30, includes both message lines 25''m and control lines 25''c.

The input message channels 18''m are applied to write amplifiers within the serial memory system of applications' earlier application and there identified by the reference numeral 30. The multiple channel line 18''m also connects to a hole detector unit 90 and to an end message recognition circuit 92 whose outputs are combined in a two-input "or" circuit 94. The "or" circuit 94 output connects to the set terminal S of a read-write flip-flop (not shown) identified by the reference numeral 38 in the earlier application. The "or" circuit 94 output is also transmitted through the multi-channel cable 18''c and the switch center 14 to apply a "stop" signal to the tape unit 10.

The line 25''c also connects to an "or" circuit 96, a second input of which connects to the Tape Equal Message output of the extractor circuit 24 described above. The output of the "or" circuit 96 is a Start impulse which is applied to an erasing circuit 98 to clear the serial memory 88, and to a delay 100. A third input to the "or" circuit 96 connects to the output of the "end of read" output gate (not shown), identified by reference numeral 144 in the applicants' above-mentioned serial memory application. The output of the memory is applied on channels 25''m, through the switch 30 to the input-output printer 34 of Figure 1.

Figure 4:
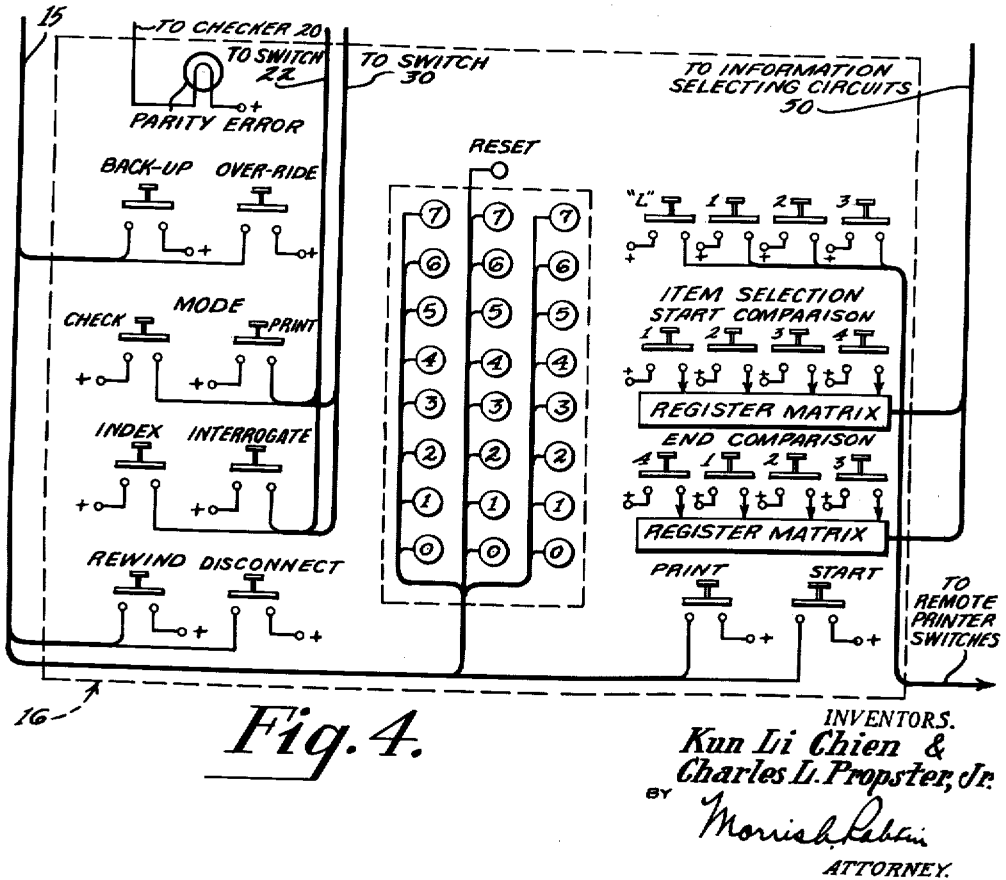
Figure 4 is a diagram of the console of an information extractor according to the present invention and in which the various control switches are shown and their functions described.

Figure 4 is an idealized diagram of a console suitable for use in a system of Figure 1. Although individual circuits will not be shown in detail, it is to be understood that the description is one of function only. Four mode selection buttons are shown and are labeled Check, Print, Index, and Interrogate. The outputs of each of the four buttons is applied on the control lines to the switches 22 of Figure 1. In addition, energizing signals are generated which are applied to control lines 15 and 28. In the explanation of function to follow, the manner of connecting the buttons to the elements of the circuits will be apparent to one skilled in the art.

Two additional control buttons are provided, one for back-up and one for over-ride. The back-up button connects to a special circuit in the tape files 10 through the switching center 14 and provides a signal to reverse a tape until the beginning of a message is reached. The over-ride button provides a signal which permits the printer to skip an erroneous character that may be, for example, an improper combination of binary signals.

A "rewind" and a "disconnect" button are located on the console 16. The rewind button applies a signal to the tape files 10 to rewind a tape entirely. The disconnect button provides a signal to the switching center 14 which permits the release of the tape 10 to which the switching center 14 is then connected. In the central portion of the console 16 are located the tape addressing buttons in three columns. Each button has an octal number designation which may be represented by a combination of three binary digits. The octal address numbers are combined in a cable which connects to the switching center 14. A matrix (not shown) selects a particular tape from the signals of the individual buttons.

On the right side of the console, a set of printer station buttons is shown marked respectively "L" (for local), 1, 2 and 3. Energization of these buttons controls the action of switch 36 and similar switches to print out information from the interrogation system on remote printers 40 or other printers under the control of the buttons 1, 2, and 3.

A set of item selection buttons are shown which determine the settings for the information selection circuits 50 of Figure 2. The buttons 1, 2, 3, and 4 on the Start Comparison set permit a start comparison signal to be generated at the beginning of the first, second, third or fourth item of the message. Similarly, End Comparison buttons are provided to condition the information selecting circuits 50 to end the comparison after either the fourth, the first, the second or the third item.

A print memory button is provided which enables the extractor unit 24 to print the contents of its memory on the input-output printer 34 of Figure 1. A Start button is also provided to initiate any of the operations.

Known input-output printers are commercially available and may be equipped with circuitry that produces a "demand" pulse whenever the printer is ready to accept a character to be printed. Demand pulses are provided from the printer 34 of Fig. 1 on control channel 25''c which connects to the proper terminals (not shown) within the above described serial memory circuits.

To interrogate the storage tape files 10, a particular tape station 10 is selected and its address is keyed into the console 16 of Fig. 1. The switching center 14 addresses the particular tape file and connects its message and control lines to the interrogation system.

The console 16 signals switch 22 to connect the switching center 14 output to the extractor 24 on lines 18′ and similarly signals switch 30 to connect output-input line 32 to the cable 25′ going to the extractor 24. The location of the order determining portion or criterion within the message is specified by suitable other keys at the console 16. Signals thus produced are transmitted by the control channel line 28 to set up the information selecting circuit 50 of the extractor 24 of Fig. 2.

In connection with Fig. 2, as the interrogate button is depressed and the switch 68 is thrown connecting the storage register 66 with the incoming message line 25′*m*, the switch 56 is also thrown connecting the "or" circuit 60 with the multichannel message line 25′*m*. An impulse is also provided at the "or" circuit 58 for resetting the address counter of the memory 64. As each character of the criterion is inserted, it is applied to the multichannel line 25′*m* and each character is placed in the storage register 66 through the switch 68.

Simultaneously, the multiple bits which make up the character are applied to the "or" circuits 60 and a pulse is derived from at least one of them to energize the timing pulse generator 62. TP1 thus generated, is applied to the read-out terminal of the memory 64. The character in the first address location within the memory 64 is read-out into the switch 68 which is open to the output from the memory, thus discarding the character. At TP2, the read-in terminal is pulsed and the contents of the storage register 66, the first criterion character, is read into the now empty first address location of the memory 64. At TP3, the address counter of the memory 64 is pulsed, changing the memory location being addressed. At TP4, the storage register 66 is reset.

The criterion of the message desired is supplied character by character from the input printer 34 to the memory 64 until either the memory 64 is full or all of the criterion characters have been inserted.

As a check on the accuracy of the operator, the contents of the memory 64 may be printed out. A print memory key is depressed at the console 16 of Fig. 1. A signal is applied to the "or" circuit 58 to reset the counter of the memory 64. The switch 68 connects the memory 64 output to the storage register input 66. The switch 56 connects the output of the "and" circuit 52 into the "or" circuit 60. No tape is running at this time, and the message channels 25′*m* are isolated from the circuit controlling read-out. The "and" gates 78 and 80 are enabled.

A "demand" pulse from the input-output printer 34 of Figure 1, is passed through the "and" gate 80 to the "or" circuit 60. A set of timing pulses is then produced in the timing pulse generator 62. The first timing pulse TP1, reads-out the character from the first memory address into the storage register 66. The storage register 66 output connects to both the memory 64 and to the enabled "and" gate 78. The multichannel output of the "and" gate 78 is applied through the message channels 25′*m* to the input-output printer 34 which prints the character.

At TP2, the contents of the register 66 are put back in the memory 64 and at the same address location. At TP3, the address counter is stepped to the next memory address. At TP4, the storage register 66 is reset and ready for a new character. With each succeeding demand pulse from the input-output printer 34 of Fig. 1, the "or" circuit 60 output generates a new set of timing pulses and the cycle is repeated.

After checking the contents of the memory 64, the start button may be energized. The switches 22 and 30 are unchanged. Switch 56 remains in position to connect the output of the "and" gate 52 to the inputs of the "or" circuit 60. The switch 68 is similarly left unaffected, connecting the output of the memory 64 to the input of the storage register 66.

A start signal is applied to the addressed tape file 10 and the tape transport is energized. The message on the selected tape is transmitted to the extractor 24 on multiple channel line 18′*m*. The message signals are applied to the comparator 54, the information selecting circuit 50, and to the input of the "and" gate 52 which is controlled by a signal from the information selection circuits 50. The information selection circuits 50 examine the incoming signals. At the beginning of the message portion selected for the criterion, a start comparison signal is generated by the information selection circuits 50. The comparator 54 is enabled, the flip-flop 70 is reset, the "and" gate 52 is enabled, and the "or" circuit 58 is pulsed, resetting the counter of the memory 64. The next character from the tape is applied to the comparator 54. The character is also applied through the "and" gate 52 and the switch 56 to the "or" circuit 60. At least one signal channel contains a character signal which passes through the "or" circuit 60 to energize the timing pulse generator 62.

The character at the first memory location is read-out through the switch 68 into the storage register 66. The output of the storage register 66 is applied to the comparator 54 and the memory 64. The TP2 pulse reads the character in the storage register 66 back into the memory 64. At TP3, the address counter is triggered to the second address location. At TP4, the storage register 66 is reset.

When any corresponding criterion characters of the tape and stored criterion characters are not identical, the inequality terminal applies a pulse to set the not equal flip-flop 70. The (O) output of the flip-flop 70 is disabled, inhibiting the "and" gate 72. Successive character comparisons do not change the state of the not equal flip-flop 70. After the last character of the criterion is selected, the information selection circuits 50 provide a stop comparison signal which is applied to the "and" gate 72. The not equal flip-flop 70 is set and no enabling signal is applied to the "and" gate 72. The tape file 10 therefore continues to run.

As the next message comes from the tape 10, the information selection circuit 50 again selects the criterion portion of the message and a start comparison signal is furnished. The not equal flip-flop 70 is reset, enabling the "and" gate 72. The stored criterion is again compared, character by character, with the message criterion. If the criteria are identical, the not equal flip-flop 70 remains in a reset state. The stop comparison signal is applied to the "and" gate 72, which is enabled, and a signal, tape equals message, TEM, is transmitted.

The output of the "and" gate 72 is applied to the buffer storage serial memory 26 of Fig. 1 and to the tape file through control channel 18′*c* to stop the tape.

The tape file 10 is programmed to stop the tape, back-up to the beginning of the message, and stop again upon the application of the Tape Equals Message signal. Suitable tape back-up circuitry and logic is shown, for example, in the copending application of Howard P. Guerber and Stephen M. Fillebrown entitled "Sorting Device," Serial No. 556,128, filed December 29, 1955, and assigned to the assignee of the present invention. In that application, a circuit is described which, upon the receipt of a "Stop Reverse" signal, backs up a tape to the start of a message and then stops the tape. At the application of the next start pulse, the tape runs in the forward direction. In the present embodiment, the Tape Equals Message Signal may generate the Stop Reverse signal. The tape, stopped within the message, is reversed, runs until the start of the particular message is detected, and stopped.

The Tape Equals Message signal is also applied to the console 16. The mode of operation is changed to "Print" which changes the position of switches 22 and 30, connecting the tape file 10 and the printer 34 to the buffer storage 26 rather than to the extractor 24.

When the back-up cycle is completed and the tape is at the beginning of the message, a signal is returned to the console 16. A "start" signal is generated and applied to the circuits of Fig. 3. The "or" circuit 96 applies the "start" signal to the erase circuit 98 which erases the memory 88. After a delay, a start impulse is provided on control channel 18''c to start the magnetic tape.

The tape 10 is started and the entire message is placed into the buffer storage 26 of Figs. 1 and 3. As the message comes from the tape file 10 it is placed in the serial memory 88 of the buffer storage 26. With reference to the applicants' serial memory system application, the occurrence of the first message character places an index pulse in a special channel of a magnetic drum, and the entire message is placed in the message channels of the drum in the course of one drum revolution. When either an End Message, EM, signal is recognized in the recognizer 92 or a gap or long interval is detected at the hole detector 90, a signal is produced at the "or" circuit 94 to produce a "stop" signal on control line 18''c which is applied to the tape station 10 to stop the tape. At the same time the read-write flip-flop of the applicants' serial memory is set.

The serial memory 88 is placed in read-out mode. The precise manner of operation is fully described in the applicants' Serial Memory application. For the purpose of the present invention, it is sufficient to describe the operation in general terms. A demand pulse is provided by the input-output printer 34 of Fig. 1, whenever it is ready to print a character. This demand pulse energizes the write-out circuit which provides a character to the printer 34. As each character is read from the drum, a mark is placed in a separate marking channel. The presence of a character in the marking channel inhibits the reading of a character in corresponding message channels at the same character location.

Each mark in the marking channel corresponds to a character in the message channels. Therefore if 512 characters are in the message channels, 512 marks may be placed in the marking channel, each corresponding to a character that has been read-out. A character has yet to be read out if there is no mark in the corresponding marking channel. The marking channel read head inhibits reading from the message channels so long as marks are detected.

At the occurrence of an End of Read pulse, the read-write flip-flop is reset and the "or" circuit 96 is signalled energizing the erase circuit 98. After a delay, a "start" signal is again transmitted to the console 16.

In certain information handling systems, a message may be of non-standard length, being divided only into blocks, each of which may have a fixed length with an additional, shorter block. In order to indicate the beginning and end of messages, special symbols, such as Start Message, SM, and End Message, EM, are placed at the beginning and end of the message, respectively. Where a message may be composed of several blocks, an SM symbol is placed at the beginning of the first block of the message and the EM symbol is placed at the end of the message in the last block. Therefore, intermediate blocks may start and end without special character signals and, accordingly, the delay 100 provides a "start" signal to the tape station 10 to continue the next block of the message. The End Message signal is applied to the console 16 to disable the start signal. Should it be desired to write the next message of the tape, the Start button at the console 16 may be depressed. The next message on the tape is then placed in the buffer storage 26 and is read out character by character to the input-output printer 34.

The Print button signals the system to write out any message on the tape at the reading heads. That message on the tape will be read into the memory 88, and the message will be written out, a character at a time, on demand of the printer 34.

For operation in the check mode, the Check button at the console 16 is depressed. After the tape station 10, whose tape is to be checked, has been addressed and connected by the switching center 14, the Start button is pressed to start the tape. So long as no error signal is produced at the parity checker-staticizer 20, of Figure 1, the tape will continue to run. When either an error or the end of the tape is detected, the tape stops and a corresponding signal lamp flashes at the console 16. The message containing the error may be printed out by actuating the Back-up button. The Back-up button signals "Stop Reverse" to the tape station 10, the tape backs up until the beginning of the message in question is reached, and the system is switched into the print mode. The Start button is actuated and the tape starts, placing the message in the buffer storage 26. The message is printed out by the printer 34 until the error is reached. The printer 34 then stops, controlled by a safety circuit within the printer 34.

An Override button is provided to enable the printer to skip the error and to continue to print the message. A space or a character symbol may be manually placed in the printer output at the location of the error.

An index may be written by energizing the index button. The tapes 10 are connected as in the check mode described above. The first message of each tape station may be printed out on the output printer 34 or on a remote printer 40 of Fig. 1. Controls within the printer (not shown) may terminate the print-out at a portion of the first line or at the end of the first line. Each tape station 10 may be addressed in order and its first message printed out. For index purposes it may be preferable to have portions of the first lines of each message which may provide a ready reference for later interrogations.

Thus, there has been disclosed an information extracting system which may interrogate a large scale library for particular messages, either individually or from a prepared list at the option of the operator. An index, prepared by the information extracting system, may provide the operator with an indication as to which tape file to connect for the extraction of any particular message. The entire tape file may be reviewed for erroneous messages or erroneous characters resulting from errors in transcription. Contents of all or a portion of any tape may be printed out without using the larger units of the information handling system.

What is claimed is:

1. A device for locating a message in a message store containing a plurality of messages each having an order determining criterion, said device comprising information selection means connected to receive said messages seriatim from said store and to provide a control signal during the reception of each said message criterion from said message store, a memory for storing a criterion for comparison with each said order determining criterion, means enabled by said control signal for controlling the readout of said memory, and a comparator connected to receive said messages from said store and the output of said memory and enabled by said control signal.

2. A device for extracting information from a message store containing a plurality of messages each having an order determining criterion, said device comprising information selection means connected to said store for providing a control signal during the presentation of each said message criterion from said message store, a memory for storing a criterion for comparison with each said order determining criterion, means enabled by said control signal for controlling the readout of said memory, a comparator enabled by said control signal and connected to receive and compare each said criterion from said store with the output of said memory, and signalling means responsive to the state of said comparator for providing a signal indicative of said comparison.

3. A device for extracting information from a message store containing a plurality of messages each having an order determining criterion, said device comprising an information selection means connected to receive said messages from said store and to provide a control signal during the reception of each said message criterion therefrom, a memory for storing a criterion of extraction for comparison with said order determining criterion, memory control means enabled by said control signal for controlling the readout of said memory, a comparator enabled by said control signal and connected to receive at its inputs and compare said messages with the output of said memory, said comparator including signalling means providing a compare signal when said inputs to said comparator are equal, an output device, and means responsive to said compare signal for connecting said message store to said output device.

4. A device for extracting information from a message store containing a plurality of messages each having an order determining criterion, said device comprising information selection means connected to receive said messages seriatim from said message store and to provide a control signal during the reception of each said message criterion, memory means for storing an extract criterion of a desired message for comparison with each said order determining criterion one at a time, memory control means enabled by said control signal for controlling the readout of said memory, a comparator enabled by said control signal and connected to receive and compare said messages from said store with the output of said memory, signalling means responsive to the state of said comparator for providing a compare signal when said desired message is located in said store, storage means, and means responsive to said compare signal for gating said desired message to said storage means.

5. In combination with a message store containing a plurality of messages represented by coded signal combinations, each of said messages having an order determining criterion, and means for reading sequentially said messages, a device for extracting a desired message from said store comprising selection control means connected at its input to said reading means, information selection means normally connected to the output of said selection control means for providing a control signal during the reading of each said criterion, a memory for storing a coded signal combination as the criterion of said desired message for comparison with the criterion output of said reading means, means enabled by said control signal for controlling the readout of said memory, and a comparator enabled by said control signal and connected to receive the output of said selection control means with the output of said memory.

6. In combination with a message store containing a plurality of messages represented by coded signal combinations, each of said messages having an order determining criterion, and means for reading sequentially said messages, a device for locating a desired message in said store comprising information selection means connected to said reading means for providing a control signal during the reading of each said criterion, a memory for storing a coded signal combination as the criterion of said desired message for comparison with said order determining criterion, means enabled by said control signal for controlling the readout of said memory, a comparator enabled by said control signal and connected to receive and compare the criterion output of said reading means with the output of said memory, and signaling means responsive to the state of said comparator for providing a signal when the inputs to said comparator are the same.

7. In combination with a message store containing a plurality of messages represented by coded signal combinations, each of said messages having an order determining criterion, and means for reading sequentially said messages, a device for extracting a desired message from said store comprising selection control means connected at its input to said reading means, an information selection means normally connected to the output of said selection control means for providing a control signal during the reading of each said order determining criterion, a memory for storing a coded signal combination as the criterion of extraction for comparison with the criterion output of said selection control means, means enabled by said control signal for controlling the readout of said memory, a comparator enabled by said control signal and connected to receive at its inputs and to compare the criterion output of said selection control means with the output of said memory, signalling means responsive to the state of said comparator for providing a compare signal when said inputs to said comparator are identical, an output device, and means responsive to said compare signal for connecting the output of said selection control means to the input of said output device.

8. In combination with a message store containing a plurality of messages represented by coded signal combinations, each of said messages having an order determining criterion, and means for reading sequentially said messages, a device for extracting a desired message from said store comprising selection control means connected at its input to said reading means, information selection means normally connected to the output of said selection control means for providing a control signal during the reading of each said order determining criterion, a memory for storing a coded signal combination as the criterion of extraction, means enabled by said control signal for controlling the readout of said memory, a comparator enabled by said control signal and connected to receive the output of said selection control means and the output of said memory, said comparator including means providing a compare signal when the inputs to said comparator are equal, an output device, and means for applying said compare signal to said selection control means for switching the output thereof to said output device.

9. In combination with a message store comprising a plurality of storage devices each containing a plurality of messages represented by coded signal combinations, each of said messages having an order determining criterion, apparatus for locating a desired message in said store comprising information selection means connected to receive said messages seriatim from said store and to provide a control signal during the reception of each said message criterion, a memory for storing a coded signal combination for comparison with each said order determining criterion, means enabled by said control signal and responsive to said coded signal combinations from said message store for controlling the readout of said memory, switching means for connecting one of said storage devices of said store to the inputs respectively of said information selection means and said memory control means, and a comparator enabled by said control signal and connected to receive the output of said one of said storage devices and the output of said memory.

10. In combination with a message store comprising a plurality of storage devices each containing a plurality of messages represented by coded signal combinations, each of said messages having an order determining criterion, a device for extracting a desired message from said store comprising a memory for storing a coded signal combination as the criterion of extraction, an information selection means for receiving said messages from said store and for providing a control signal during the reception of each said order determining criterion, switch means for connecting one of said storage devices to the input of said information selection means, means enabled by said control signal and responsive to said coded signal combinations from said store for controlling the readout of said memory, a comparator enabled by said control signal and connected to receive and compare the criterion output of said one of said storage devices with the output of said memory, signalling means providing a compare signal when said desired message is located, storage means, and means responsive to said compare signal for connecting the output of said one of said storage devices to the input of said storage means.

References Cited in the file of this patent

UNITED STATES PATENTS

| | | |
|---|---|---|
| 2,702,380 | Brustman | Feb. 15, 1955 |
| 2,708,267 | Weidenhammer | May 10, 1955 |
| 2,721,990 | McNaney | Oct. 25, 1955 |